United States Patent
Ogawa et al.

(10) Patent No.: US 11,518,405 B2
(45) Date of Patent: Dec. 6, 2022

(54) VEHICLE CONTROL SYSTEM

(71) Applicant: MAZDA MOTOR CORPORATION, Hiroshima (JP)

(72) Inventors: Daisaku Ogawa, Hiroshima (JP); Daisuke Umetsu, Hiroshima (JP); Setsuya Kishimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 233 days.

(21) Appl. No.: 16/955,413

(22) PCT Filed: Jan. 22, 2019

(86) PCT No.: PCT/JP2019/001860
§ 371 (c)(1),
(2) Date: Jun. 18, 2020

(87) PCT Pub. No.: WO2019/146594
PCT Pub. Date: Aug. 1, 2019

(65) Prior Publication Data
US 2021/0094563 A1   Apr. 1, 2021

(30) Foreign Application Priority Data

Jan. 23, 2018   (JP) .............................. JP2018-008872

(51) Int. Cl.
*B60W 60/00*   (2020.01)
*B60W 10/18*   (2012.01)
(Continued)

(52) U.S. Cl.
CPC .......... *B60W 60/001* (2020.02); *B60W 10/04* (2013.01); *B60W 10/18* (2013.01); *B60W 10/20* (2013.01); *B60W 40/114* (2013.01)

(58) Field of Classification Search
CPC .......... B60W 10/04; B60W 30/18181; B60W 10/00; B60W 30/02; B60W 10/18;
(Continued)

(56) References Cited

U.S. PATENT DOCUMENTS 4,640,557 A * 2/1987 Panizza .................... B60T 8/34
                                                    303/155
5,134,352 A * 7/1992 Matsumoto ........... B60T 8/1755
                                                    701/72
(Continued)

FOREIGN PATENT DOCUMENTS

EP      3083357 B1 *  9/2021 ............ B60T 8/1755
JP      2004291751 A  10/2004
(Continued)

OTHER PUBLICATIONS

International Search Report issued in PCT/JP2019/001860; dated Mar. 5, 2019.
(Continued)

*Primary Examiner* — B M M Hannan
(74) *Attorney, Agent, or Firm* — Studebaker & Brackett PC (57) ABSTRACT

Provided is a vehicle control system capable of, when a swaying phenomenon occurs during towing, preventing the swaying phenomenon from becoming worse due to driving force reduction control based on an increase in steering angle-related value. This vehicle control system comprises a steering wheel, a driving force control mechanism to control a driving force of a vehicle, and a power-train control module to control the driving force control mechanism. The power-train control module is operable, upon an increase in steering angle, to control an engine to reduce an output torque of the engine and, when a reversal of yaw rate of the vehicle is repeated in a situation where the vehicle is
(Continued)

performing a towing operation, to restrict the output torque reduction based on the increase in the steering angle.

15 Claims, 6 Drawing Sheets

(51) Int. Cl.
*B60W 10/20* (2006.01)
*B60W 10/04* (2006.01)
*B60W 40/114* (2012.01)

(58) Field of Classification Search
CPC .. B60W 60/001; B60W 40/114; B60W 10/06; B60W 10/20; B60T 8/1755; B60T 8/175; B60T 2230/06
USPC .............................................. 701/23, 41, 72
See application file for complete search history.

(56) References Cited

U.S. PATENT DOCUMENTS

| | | | | | |
|---|---|---|---|---|---|
| 5,163,530 | A * | 11/1992 | Nakamura | ............ | B60W 10/11 180/197 |
| 5,172,961 | A * | 12/1992 | Inoue | ............... | B60T 8/175 303/146 |
| 6,223,114 | B1 * | 4/2001 | Boros | ............... | B60T 8/17552 701/72 |
| 7,028,805 | B2 * | 4/2006 | Tsuchiya | ............ | B62D 5/0463 701/41 |
| 7,272,481 | B2 * | 9/2007 | Einig | .............. | G05D 1/0891 303/146 |
| 8,326,504 | B2 * | 12/2012 | Wu | ................. | B60T 8/248 303/189 |
| 8,740,317 | B2 * | 6/2014 | Wu | ................. | B60W 40/11 303/146 |
| 9,026,311 | B1 * | 5/2015 | Pieronek | ............ | B60W 10/18 280/455.1 |
| RE46,828 | E * | 5/2018 | Spillane | ............. | B60W 10/02 |
| 10,011,228 | B2 * | 7/2018 | Hu | .................. | B60D 1/06 |
| 2002/0003057 | A1 * | 1/2002 | Mori | ............... | B60K 23/0808 180/233 |
| 2002/0041167 | A1 * | 4/2002 | Kitano | ................. | B60K 28/16 318/3 |
| 2002/0109403 | A1 * | 8/2002 | Yamamoto | ............ | B60T 17/18 303/146 |
| 2003/0200016 | A1 * | 10/2003 | Spillane | ............. | B60W 10/22 701/36 |
| 2005/0029754 | A1 * | 2/2005 | Ueno | ................. | B60T 8/17558 280/5.502 |
| 2006/0015236 | A1 * | 1/2006 | Yamaguchi | ......... | B60K 17/358 180/242 |
| 2006/0125313 | A1 * | 6/2006 | Gunne | ................ | B60T 7/20 303/7 |
| 2006/0155457 | A1 * | 7/2006 | Waldbauer | ............ | B60T 8/1755 701/72 |
| 2008/0114511 | A1 * | 5/2008 | Sakugawa | ............ | B62D 6/003 701/41 |
| 2008/0172163 | A1 * | 7/2008 | Englert | ............... | B60T 8/1708 303/147 |
| 2009/0043469 | A1 * | 2/2009 | Fukuda | ............. | B60K 23/0808 701/69 |
| 2009/0105906 | A1 * | 4/2009 | Hackney | .............. | B60T 8/1755 701/99 |
| 2009/0198425 | A1 * | 8/2009 | Englert | ................. | B60D 1/58 701/70 |
| 2011/0060505 | A1 * | 3/2011 | Suzuki | ............... | B60T 7/12 701/41 |
| 2011/0297460 | A1 * | 12/2011 | Chess | ................. | B60W 10/02 180/6.66 |
| 2012/0109471 | A1 * | 5/2012 | Wu | ..................... | B60T 8/1755 701/49 |
| 2012/0253546 | A1 * | 10/2012 | Handa | ............... | B60K 23/0808 701/1 |
| 2012/0253630 | A1 * | 10/2012 | Handa | ............... | B60K 23/0808 701/99 |
| 2013/0030665 | A1 * | 1/2013 | Nishio | ................. | B60W 40/10 701/99 |
| 2013/0261898 | A1 * | 10/2013 | Fujita | ................... | B62D 6/003 701/42 |
| 2015/0094925 | A1 * | 4/2015 | Senoo | ................. | F16D 63/006 701/70 |
| 2015/0246675 | A1 * | 9/2015 | Matsunaga | ......... | B60W 10/184 701/1 |
| 2016/0046287 | A1 * | 2/2016 | Owen | .................. | B60W 10/04 701/43 |
| 2016/0159225 | A1 * | 6/2016 | Nakatsu | .............. | B60L 15/2009 701/70 |
| 2016/0185216 | A1 * | 6/2016 | Clarke | ................. | B60K 6/387 74/665 F |
| 2016/0207509 | A1 * | 7/2016 | Kida | ...................... | G08G 1/166 |
| 2016/0272211 | A1 * | 9/2016 | Igarashi | ............. | B60W 30/025 |
| 2017/0088173 | A1 * | 3/2017 | Kawabe | ............... | B62D 1/00 |
| 2017/0129479 | A1 * | 5/2017 | Sunahara | ............ | B60W 30/045 |
| 2017/0129480 | A1 * | 5/2017 | Sunahara | ........ | B60W 30/18145 |
| 2017/0129481 | A1 * | 5/2017 | Umetsu | ................ | B60W 30/045 |
| 2017/0129482 | A1 * | 5/2017 | Sunahara | ............ | B60W 30/045 |
| 2017/0355397 | A1 * | 12/2017 | Watanabe | ............ | B60W 30/02 |
| 2018/0001888 | A1 * | 1/2018 | Takahara | ............ | B60W 30/045 |
| 2018/0079406 | A1 * | 3/2018 | Izumi | ................... | B62D 15/022 |
| 2018/0079407 | A1 * | 3/2018 | Izumi | ................... | B62D 15/0225 |
| 2018/0222481 | A1 * | 8/2018 | Okada | ................. | B60K 17/344 |
| 2018/0273024 | A1 * | 9/2018 | Umetsu | ................. | B60W 30/02 |
| 2019/0061739 | A1 | 2/2019 | Yoshioka et al. | | |

FOREIGN PATENT DOCUMENTS

| | | | |
|---|---|---|---|
| JP | 2011-079470 | A | 4/2011 |
| JP | 2014-113955 | A | 6/2014 |
| JP | 6112304 | B2 | 4/2017 |
| JP | 2017132343 | A | 8/2017 |
| KR | 20090100018 | A | 9/2009 |
| KR | 20160073745 | A | 6/2016 |
| WO | 2017183415 | A1 | 10/2017 |

OTHER PUBLICATIONS

An Office Action; "Notice of Reasons for Refusal", mailed by the Japanese Patent Office dated Dec. 6, 2021, which corresponds to Japanese Patent Application No. 2018-008872 and is related to U.S. Appl. No. 16/955,413; with English language translation.

International Preliminary Report on Patentability and Written Opinion issued in PCT/JP2019/001860; dated Jul. 28, 2020.

* cited by examiner

VEHICLE CONTROL SYSTEM

TECHNICAL FIELD

The present invention relates to a vehicle control system, and more particularly to a vehicle control system which comprises a steering device, a driving force control mechanism to control a driving force of a vehicle, and a processor to control the driving force control mechanism.

BACKGROUND ART

During towing in which a towing vehicle (tractor) tows a towed vehicle (trailer), if the vehicle speed of the towing vehicle is increased, there can arise a swaying phenomenon that the trailer sways right and left with respect to a traveling direction of the tractor. There has been known a technique of controlling a brake device of the tractor or trailer so as to suppress the swaying phenomenon (see, for example, the following Patent Document 1).

Meanwhile, there has been proposed a vehicle behavior control device configured to reduce an output torque of an engine (torque to be generated by the engine) according to a yaw rate-related quantity (e.g., yaw acceleration) corresponding to steering manipulation by a driver, thereby making it possible to quickly generate a deceleration in a vehicle in response to start of the steering manipulation by the driver and thus quickly apply a sufficient load to front road wheels as steerable road wheels (see, for example, the following Patent Document 2). In this device, in response to start of the steering manipulation, a load is quickly applied to the front road wheels to cause an increase in frictional force between each of the front road wheels and a road surface and thus an increase in cornering force of the front road wheels, thereby improving turn-in ability of the vehicle in an initial phase after entering a curve, and improving responsiveness to a turning manipulation of a steering wheel (i.e., steering stability). This makes it possible to realize vehicle attitude control conforming to the intention of the driver.

CITATION LIST

Patent Document

Patent Document 1: JP 2017-132343A
Patent Document 2: JP 6112304B

SUMMARY OF INVENTION

Technical Problem

If the technique described in the Patent Document 2 is directly applied to the tractor, the control of generating a deceleration in a vehicle will also be triggered by influences of a steering manipulation by a driver seeking to suppress the swaying phenomenon, and a disturbance applied to steerable road wheels of the tractor due to the swaying phenomenon of the trailer. Thus, a yaw rate response of the vehicle to the steering manipulation and the disturbances is likely to be accelerated. In this case, unnecessary or excessive attitude control from the view point of suppressing the swaying phenomenon will be executed, thereby leading to a possibility that the swaying phenomenon is undesirably promoted or cannot be sufficiently suppressed.

The present invention has been made to solve the above conventional problem, and an object thereof is to provide a vehicle control system capable of, when the swaying phenomenon occurs during towing, preventing the swaying phenomenon from becoming worse due to driving force reduction control based on an increase in steering angle-related value.

Solution to Technical Problem

In order to achieve the above object, the present invention provides a vehicle control system comprising: a steering device; a driving force control mechanism configured to control a driving force of a vehicle; and a processor configured to control the driving force control mechanism, wherein the processor is configured: to control the driving force control mechanism to reduce the driving force of the vehicle, when a steering angle-related value related to a steering angle of the steering device increases; and to restrict a reduction of the driving force based on an increase in the steering angle-related value, when a reversal of yaw rate of the vehicle is repeated in a situation where the vehicle performs a towing operation.

In the vehicle control system of the present invention having the above feature, when the reversal of yaw rate of the vehicle is repeated i.e., a swaying phenomenon occurs, in the situation where the vehicle performs the towing operation, the processor operates to restrict control of generating a deceleration in the vehicle by means of the reduction of the driving force based on the increase in the steering angle-related value. Thus, under occurrence of the swaying phenomenon, it is possible to restrict execution of the driving force reduction control based on influences of a steering manipulation by a driver seeking to suppress the swaying phenomenon, and a disturbance applied to steerable road wheels of the tractor (the vehicle) due to the swaying phenomenon of a trailer, thereby preventing the swaying phenomenon from being undesirably promoted by the driving force reduction control. That is, it is possible to restrict execution of unnecessary or excessive attitude control from the view point of suppressing the swaying phenomenon, thereby preventing the swaying phenomenon from becoming worse due to the driving force reduction control based on the increase in the steering angle-related value.

Preferably, in the vehicle control system of the present invention, when a cycle period of the reversal of the yaw rate of the vehicle is equal to or less than a given value, the processor is configured to restrict the reduction of the driving force based on the increase in the steering angle-related value.

According to this feature, it is possible to accurately determine, based on the cycle period (repetition period) of the reversal of the yaw rate of the vehicle, whether or not the swaying phenomenon occurs. This makes it possible to, when no swaying phenomenon occurs, perform the vehicle attitude control conforming to the intention of the driver, and, when the swaying phenomenon occurs, prevent the swaying phenomenon from becoming worse due to the driving force reduction control based on the increase in the steering angle-related value.

More preferably, in the above vehicle control system of the present invention, when an amplitude of the reversal of the yaw rate of the vehicle is equal to or greater than a given value, the processor is configured to restrict the reduction of the driving force based on the increase in the steering angle-related value.

According to this feature, it is possible to accurately determine, based on the amplitude of the reversal of the yaw rate of the vehicle, whether or not the swaying phenomenon occurs. This makes it possible to, when no swaying phenomenon occurs, perform the vehicle attitude control conforming to the intention of the driver, and, when the swaying phenomenon occurs, prevent the swaying phenomenon from becoming worse due to the driving force reduction control based on the increase in the steering angle-related value.

Preferably, in the vehicle control system of the present invention, when the reversal of the yaw rate of the vehicle is repeated in the situation where the vehicle performs the towing operation, the processor is configured to control a brake device of the vehicle, thereby suppressing the reversal of the yaw rate of the vehicle.

According to this feature, when the swaying phenomenon occurs, the brake device of the vehicle is controlled to suppress the swaying phenomenon, so that it is possible to suppress the swaying phenomenon by the control of the brake device, while preventing a situation where the swaying phenomenon becomes worse, or suppression of the swaying phenomenon is hindered, due to the driving force reduction control based on the increase in the steering angle-related value.

Preferably, in the vehicle control system of the present invention, when a repetition of the reversal of the yaw rate of the vehicle occurs in a situation where the driving force control mechanism is being controlled to reduce the driving force of the vehicle based on the increase in the steering angle-related value, the processor is configured to continue the reduction of the driving force based on the increase in the steering angle-related value.

According to this feature, in the situation where the control of reducing the driving force based on the increase in the steering angle-related value is already being executed, the control of reducing the driving force based on the increase in the steering angle-related value is continued even if the swaying phenomenon occurs. This makes it possible to prevent the driver from having a feeling of strangeness due to operation of stopping the driving force reduction control to immediately return the driving force.

More preferably, in the above vehicle control system of the present invention, when the repetition of the reversal of the yaw rate of the vehicle occurs in a situation where an amount of the driving force of the vehicle to be reduced based on the increase in the steering angle-related value is equal to or greater than a given value, the processor is configured to continue the reduction of the driving force based on the increase in the steering angle-related value.

According to this feature, in the situation where the amount of the driving force of the vehicle to be reduced based on the increase in the steering angle-related value is equal to or greater than the given value, the control of reducing the driving force based on the increase in the steering angle-related value is continued even if the swaying phenomenon occurs. This makes it possible to, in a situation where, if the driving force reduction control is stopped to immediately return the driving force, the driver is highly likely to have a feeling of strangeness, continue the reduction of the driving force based on the increase in the steering angle-related value, even if the swaying phenomenon occurs, thereby preventing the driver from having a feeling of strangeness.

Preferably, in the vehicle control system of the present invention, when the reduction of the driving force based on the increase in the steering angle-related value is restricted, the processor is configured to continue a restriction on the reduction of the driving force based on the increase in the steering angle-related value until a vehicle speed becomes a given value or less.

According to this feature, in the situation where, under occurrence of the swaying phenomenon, the processor operates to restrict the reduction of the driving force based on the increase in the steering angle-related value, the restriction on the reduction of the driving force is continued until the vehicle speed of the vehicle becomes the given value or less, so that it is possible to restrict execution of unnecessary or excessive attitude control from the view point of suppressing the swaying phenomenon. This makes it possible to reliably prevent the swaying phenomenon from becoming worse due to the driving force reduction control based on the increase in the steering angle-related value.

According to another aspect of the present invention, there is provided a vehicle control system comprising: a steering device; a driving force control mechanism configured to control a driving force of a vehicle; and a processor configured to control the driving force control mechanism, wherein the processor is configured: to control the driving force control mechanism to reduce the driving force of the vehicle, when a steering angle-related value related to a steering angle of the steering device increases; and to restrict a reduction of the driving force based on an increase in the steering angle-related value, when a right-left sway of the vehicle is repeated in a situation where the vehicle performs a towing operation.

In the vehicle control system of the present invention having the above feature, when the right-left sway of the vehicle is repeated i.e., a swaying phenomenon occurs, in the situation where the vehicle performs the towing operation, the processor operates to restrict control of generating a deceleration in the vehicle by means of the reduction of the driving force based on the increase in the steering angle-related value. Thus, under occurrence of the swaying phenomenon, it is possible to restrict execution of the driving force reduction control based on influences of a steering manipulation by a driver seeking to suppress the swaying phenomenon, and a disturbance applied to steerable road wheels of the tractor (vehicle) due to the swaying phenomenon of a trailer, thereby preventing the swaying phenomenon from being undesirably promoted by the driving force reduction control. That is, it is possible to restrict execution of unnecessary or excessive attitude control from the view point of suppressing the swaying phenomenon, thereby preventing the swaying phenomenon from becoming worse due to the driving force reduction control based on the increase in the steering angle-related value.

Preferably, in the vehicle control system of the present invention, when a vehicle speed becomes a given value or less in a situation where the reduction of the driving force based on the increase in the steering angle-related value is restricted, the processor is configured to terminate a restriction on the reduction of the driving force based on the increase in the steering angle-related value.

According to this feature, in the situation where, under occurrence of the swaying phenomenon, the processor operates to restrict the reduction of the driving force based on the increase in the steering angle-related value, the restriction on the reduction of the driving force is terminated when the vehicle speed becomes the given value or less, so that it is possible to restart the driving force reduction control based on the increase in the steering angle-related value, just after the vehicle speed becomes a low value enough to be free from occurrence of the swaying phenomenon. This makes it possible to reliably prevent the swaying phenomenon from becoming worse due to the driving force reduction control based on the increase in the steering angle-related value.

According to still another aspect of the present invention, there is provided a vehicle control system comprising: a steering device; a driving force control mechanism configured to control a driving force of a vehicle; and a processor configured to control the driving force control mechanism, wherein the processor is configured: to control the driving force control mechanism to reduce the driving force of the vehicle, when a steering angle-related value related to a steering angle of the steering device increases; and to restrict a reduction of the driving force based on an increase in the steering angle-related value, when a control of suppressing a right-left sway of the vehicle is executed in a situation where the vehicle performs a towing operation.

In the vehicle control system of the present invention having the above feature, when the control of suppressing the right-left sway of the vehicle is executed, i.e., control of suppressing a swaying phenomenon is executed, in the situation where the vehicle performs the towing operation, the processor operates to restrict control of generating a deceleration in the vehicle by means of the reduction of the driving force based on the increase in the steering angle-related value. Thus, under occurrence of the swaying phenomenon, it is possible to restrict execution of the driving force reduction control based on influences of a steering manipulation by a driver seeking to suppress the swaying phenomenon, and a disturbance applied to steerable road wheels of the tractor (vehicle) due to the swaying phenomenon of a trailer, thereby preventing the swaying phenomenon from being undesirably promoted by the driving force reduction control. That is, it is possible to restrict execution of unnecessary or excessive attitude control from the view point of suppressing the swaying phenomenon, thereby preventing the swaying phenomenon from becoming worse, or suppression of the swaying phenomenon is hindered, due to the driving force reduction control based on the increase in the steering angle-related value.

Effect of Invention

When the swaying phenomenon occurs during towing, the vehicle control system of the present invention can prevent the swaying phenomenon from becoming worse due to the driving force reduction control based on the increase in the steering angle-related value.

DESCRIPTION OF EMBODIMENTS

With reference to the accompanying drawings, a vehicle control system according to one embodiment of the present invention will now be described.

Figure 1:
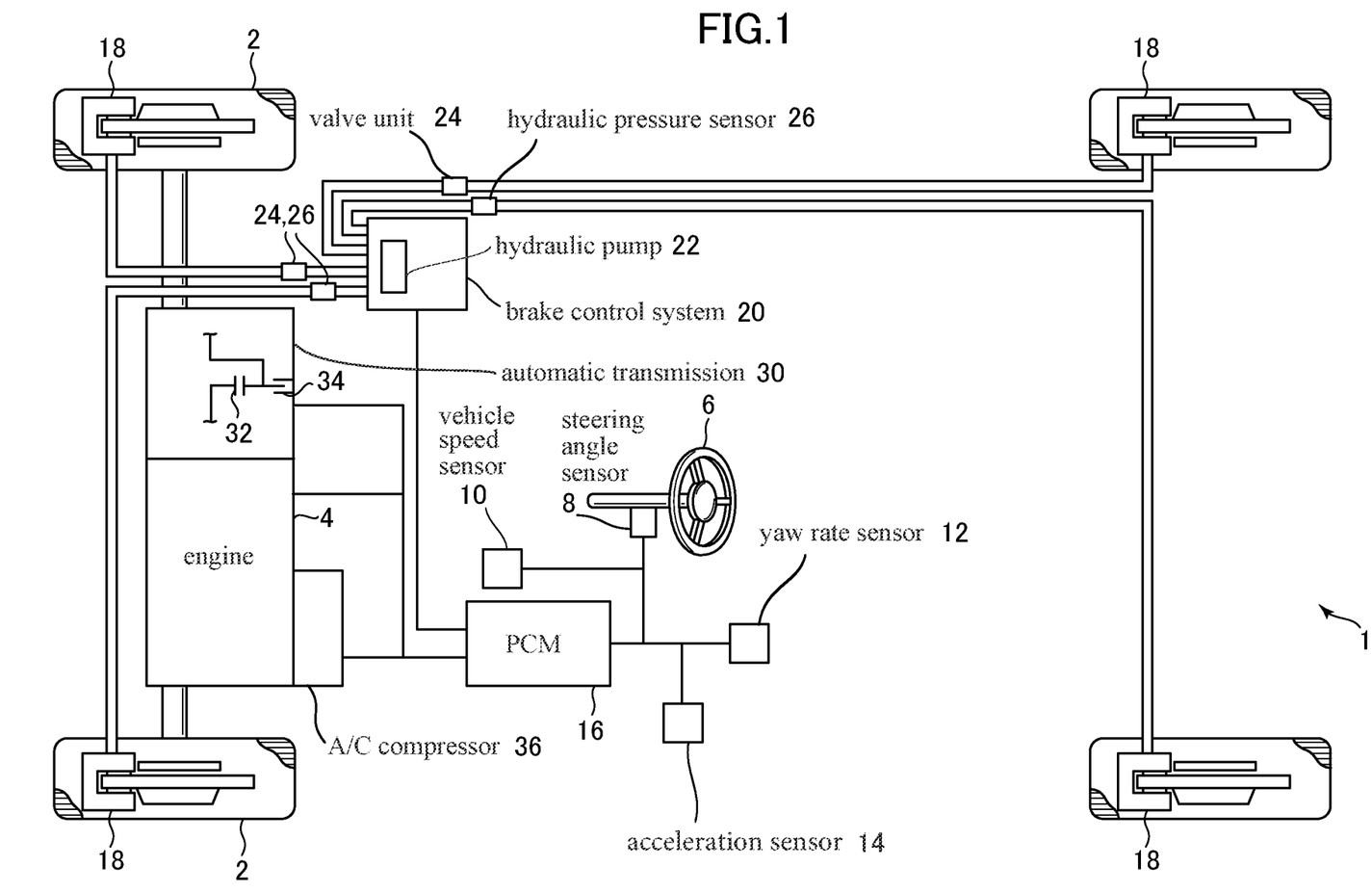
FIG. 1 is a block diagram showing the overall configuration of a vehicle equipped with a vehicle control system according to one embodiment of the present invention.

First of all, with reference to FIG. 1, a system configuration of a vehicle equipped with the vehicle control system according to this embodiment will be described. FIG. 1 is a block diagram showing the overall configuration of the vehicle equipped with the vehicle control system according to this embodiment.

In FIG. 1, the reference sign 1 denotes the vehicle equipped with the vehicle control system according to this embodiment. A vehicle body of the vehicle 1 has a front portion on which an engine 4 serving as a driving force source for driving drive road wheels (in the example illustrated in FIG. 1, right and left front road wheels 2) is mounted. The engine 4 is an internal combustion engine such as a gasoline engine or a diesel engine. In this embodiment, the engine 4 is a gasoline engine having a spark plug 28 (see FIG. 2).

The vehicle 1 is equipped with a steering angle sensor 8 for detecting a rotational angle of a steering shaft (not shown) coupled to a steering wheel 6; a vehicle speed sensor 10 for detecting a vehicle speed; a yaw rate sensor 12 for detecting a yaw rate; and an acceleration sensor 14 for detecting an acceleration. Each of these sensors is operable to output a detection value to a PCM (Power-train Control Module) 16.

The vehicle 1 is further equipped with a brake control system 20 for supplying a brake hydraulic pressure to a wheel cylinder or a brake caliper of each of four brake units 18 installed in four road wheels, respectively. The brake control system 20 comprises a hydraulic pump 22 operable to produce a brake hydraulic pressure necessary to generate a braking force in each of the brake units 18 installed in the respective road wheels. The hydraulic pump 22 is configured to be driven by electric power supplied from, e.g., a battery, so as to generate a brake hydraulic pressure necessary to generate a braking force in each of the brake units 18, even when a brake pedal is not depressed. The brake control system 20 further comprises four valve units 24 (specifically, solenoid valves) provided, respectively, in four hydraulic pressure supply lines each connected to a respective one of the brake units 18 and each operable to control a hydraulic pressure to be supplied from the hydraulic pump 22 to a respective one of the brake units 18. The degree of opening of each of the valve units 24 can be changed, e.g., by adjusting the amount of electric power to be supplied from the battery to each of the valve units 22. The brake control system 20 further comprises four hydraulic pressure sensors 26 each for detecting a hydraulic pressure supplied from the hydraulic pump 22 to a respective one of the brake units 18. Each of the hydraulic pressure sensors 26 is disposed, e.g., at a connection area between each of the valve units 24 and a downside portion of a corresponding one of the hydraulic pressure supply lines, and operable to detect a hydraulic pressure at the downstream side of each of the valve units 24 and output a detection value to the PCM (Power-train Control Module) 16.

The brake control system 20 is operable, based on a braking force instruction value input from the PCM 16, and detection values from the hydraulic pressure sensors 26, to calculate a hydraulic pressure to be independently supplied to the wheel cylinder or the brake caliper in each of the road wheels, and control a pump speed of the hydraulic pump 22 and the degree of opening of each of the valve units 24, according to the calculated hydraulic pressure.

Figure 2:
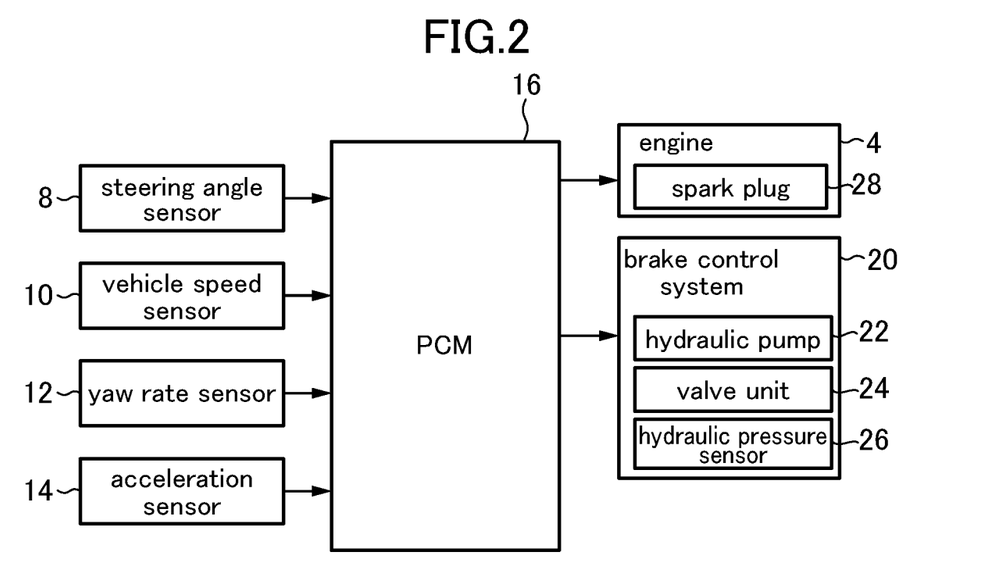
FIG. 2 is a block diagram showing an electrical configuration of the vehicle control system according to this embodiment.

Next, with reference to FIG. 2, an electrical configuration of the vehicle control system according to this embodiment will be described. FIG. 2 is a block diagram showing the electrical configuration of the vehicle control system according to this embodiment.

In the vehicle control system according to this embodiment, the PCM 16 (processor) is operable, based on detection signals from the aforementioned sensors 8, 10, 12, 14, 26 and detection signals output from various other sensors for detecting an operating state of the engine 4, to output control signals in order to perform control with respect to various components (typically including the spark plug 28, and further including a throttle valve, a turbocharger, a variable valve mechanism, a fuel injection valve, and an EGR device) of the engine 4 functioning as a driving force control mechanism, and control with respect to the brake control system 20.

The PCM 16 are composed of a computer which comprises: one or more processors; various programs (including a basic control program such as an OS, and an application program capable of being activated on the OS to realize a specific function) to be interpreted and executed by the one or more processors; and an internal memory such as ROM or RAM for storing therein the programs and a variety of data.

The PCM 16 and the brake control system 20 is equivalent to "processor" set forth in the appended claims.

Next, the content of specific control to be executed by the vehicle control system will be described.

Figure 3:
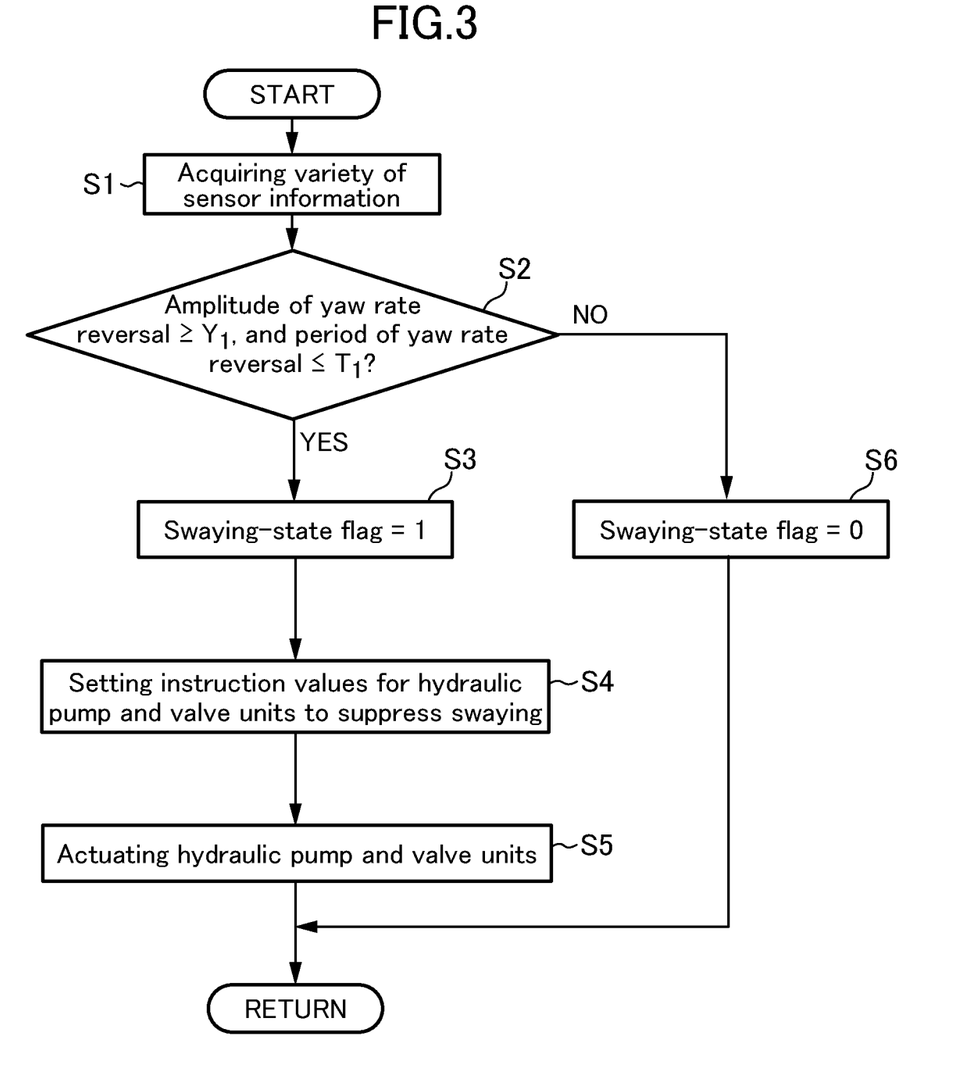
FIG. 3 is a flowchart of a sway suppression control processing routine in the vehicle control system according to this embodiment.

Firstly, with reference to FIG. 3, a sway suppression control processing routine to be executed by the vehicle control system according to this embodiment will be described. FIG. 3 is a flowchart of the sway suppression control processing routine in the vehicle control system according to this embodiment.

The sway suppression control processing routine in FIG. 3 is activated when an ignition switch of the vehicle 1 is turned on and thus electric power is applied to the vehicle control system, and repeatedly executed with a given period (e.g., 50 ms). Whether or not a trailer has been coupled may be determined, e.g., by the PCM 16, from a difference between an actual acceleration of the vehicle 1 obtained from a detection value of the acceleration sensor 14, and a target acceleration set based on manipulation of an accelerator pedal or the like, or based on an output value from a switch provided on the vehicle 1.

As shown in FIG. 3, upon start of the sway suppression control processing routine, the PCM 16 operates, in step S1, to acquire a variety of sensor information regarding a driving state of the vehicle 1. Specifically, the PCM 16 operates to acquire, as the information regarding the driving state, detection signals output from the aforementioned various sensors, including a steering angle detected by the steering angle sensor 8, the vehicle speed detected by the vehicle speed sensor 10, the yaw rate detected by the yaw rate sensor 12, the hydraulic pressures detected by the hydraulic pressure sensors 26, and one of a plurality of gear stages currently set in a transmission of the vehicle 1.

Subsequently, the PCM 16 operates, in step S2, to determine, based on the yaw rate detected by the yaw rate sensor 12, whether or not the trailer being towed by the vehicle 1 is in a swaying state. Specifically, when a reversal of the yaw rate of the vehicle 1 (i.e., a switching between a clockwise yaw rate and a counterclockwise yaw rate with respect to a traveling direction of the vehicle 1) is repeated, wherein the amplitude of the reversal (sum of a maximum value of the clockwise yaw rate and a maximum value of the counterclockwise yaw rate) is equal to or greater than a given value $Y_1$, and the period of the reversal (time period from occurrence of a reversal of the yaw rate through until the next reversal occurs) is equal to or less than a given value $T_1$, the PCM 16 operates to determine that the trailer is in the swaying state. The given values $Y_1$ and $T_1$ are values based on which it can be determined that a swaying phenomenon occurs. For example, $Y_1$=0.1 [rad/s], and $T_1$=5 [sec].

As a result, when the amplitude of the reversal of the yaw rate is equal to or greater than $Y_1$, and the period of the reversal of the yaw rate is equal to or less than $T_1$, it can be deemed that the swaying phenomenon occurs in the trailer. Thus, the PCM 16 operates, in step S3, to set a swaying state flag to 1. This swaying state flag is a flag indicative of whether or not the trailer is in the swaying state, wherein it is set to 1 when the trailer is in the swaying state, and set to 0 when the trailer is not in the swaying state. The initial value of the swaying state flag is 0.

After completion of the step S3, the PCM 16 operates, in step S4, to set instruction values for the brake units 18 to suppress the swaying phenomenon of the trailer. For example, the PCM 16 operates to set a yaw moment whose direction is oriented to suppress a yaw rate arising in the vehicle 1, and set instruction values for the hydraulic pump 22 and the valve units 24 to realize the yaw moment. The brake control system 20 preliminarily stores therein a map defining a relationship between the yaw moment and the rotation speed of the hydraulic pump 22, and operates to refer to this map to set a value of the rotation speed corresponding to a set value of the yaw moment, as an instruction value for the hydraulic pump 22. Further, the brake control system 20 preliminarily stores therein a map defining a relationship between the yaw moment and the opening of each of the valve units 24, and operates to refer to this map to set a value of the opening corresponding to the set value of the yaw moment, as an instruction value for each of the valve units 24.

Subsequently, in step S5, the PCM 16 operates to actuate the hydraulic pump 22 and the valve units 24 based on the instruction values set in the step S4. For example, the PCM 16 operates to raise electric power to be supplied to the hydraulic pump 22, thereby raising the rotation speed of the hydraulic pump 22 up to a value corresponding to the related instruction value. Further, the PCM 16 operates to raise electric power to be supplied to the solenoid valve of each of the valve units 24, thereby increasing the opening of the solenoid valve to a degree corresponding to the related instruction value.

Returning to the step S2, when the amplitude of the reversal of the yaw rate is less than $Y_1$, or the period of the reversal of the yaw rate is greater than $T_1$, it can be deemed that no swaying phenomenon occurs in the trailer. Thus, the PCM 16 operates, in step S6, to set the swaying state flag to 0.

After the step S5 or S6, the PCM 16 operates to complete one cycle of the sway suppression control processing routine.

Figure 4:
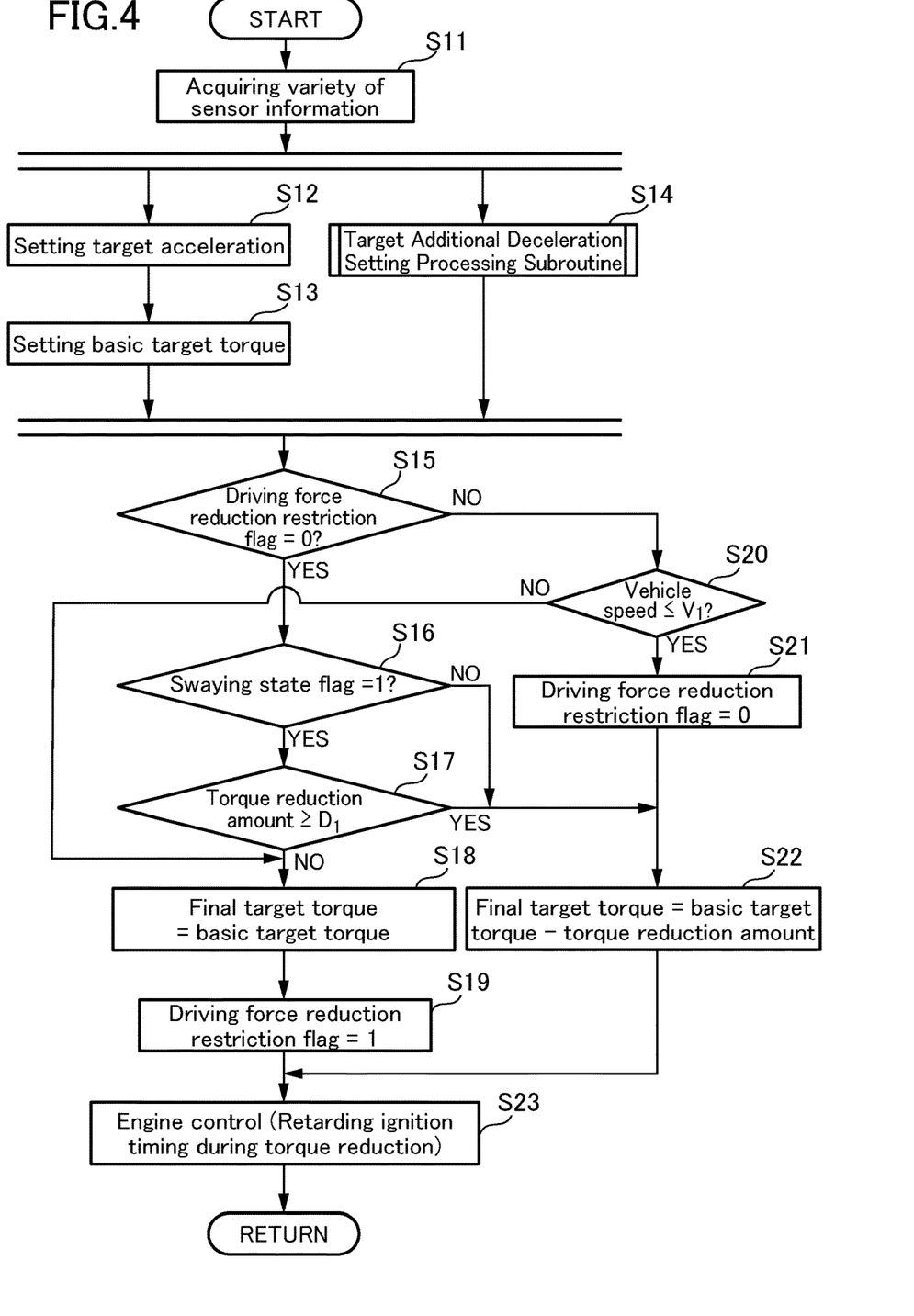
FIG. 4 is a flowchart of an attitude control processing routine in the vehicle control system according to this embodiment.

Next, an overall flow of an attitude control processing routine to be executed by the vehicle control system according to this embodiment will be described based on FIG. 4. FIG. 4 is a flowchart of the attitude control processing routine in the vehicle control system according to this embodiment.

The attitude control processing routine in FIG. 4 is activated when an ignition switch of the vehicle 1 is turned on and thus electric power is applied to the vehicle control system, and repeatedly executed with a given period (e.g., 50 ms).

As shown in FIG. 4, upon start of the attitude control processing routine, the PCM 16 operates, in step S11, to acquire a variety of information regarding the driving state of the vehicle 1. Specifically, the PCM 16 operates to acquire, as the information regarding the driving state, detection signals output from the aforementioned various sensors, including the steering angle detected by the steering angle sensor 8, the vehicle speed detected by the vehicle speed sensor 10, the yaw rate detected by the yaw rate sensor 12, the hydraulic pressures detected by the hydraulic pressure sensors 26, one of the gear stages currently set in the transmission of the vehicle 1, and an accelerator position.

Subsequently, in step S12, the PCM 16 operates to set a target acceleration, based on the driving state of the vehicle 1 acquired in the step S11 and including manipulation of the accelerator pedal. Specifically, the PCM 16 operates to select, from a plurality of acceleration characteristic maps defined with respect to various values of the vehicle speed and the plurality of gear stages (the maps are preliminarily created and stored in a memory or the like), one acceleration characteristic map corresponding to a current value of the vehicle speed and a current one of the gear stages, and set, as the target acceleration, a value of the acceleration corresponding to a current value of the accelerator position, with reference to the selected acceleration characteristic map.

Subsequently, in step S13, the PCM 16 operates to set a basic target torque of the engine 4 for realizing the target acceleration set in the step S12. In this process, the PCM 16 operates to set the basic target torque within a torque range outputtable by the engine 4, based on current values of the vehicle speed, a road grade and a road surface μ, a current one of the gear stages, etc.

In parallel to the processings in the steps S12 and S13, the PCM 16 operates, in step S14, to execute a target additional deceleration setting processing subroutine to set, based on a value related to the steering angle (steering angle-related value), a torque reduction amount necessary to generate a deceleration in the vehicle 1 to thereby control the vehicle attitude. The first and second embodiments will be described on the assumption that the steering angle is used as the steering angle-related value.

Next, with reference to FIGS. 5 and 6, the target additional deceleration setting processing subroutine will be described.

Figure 5:
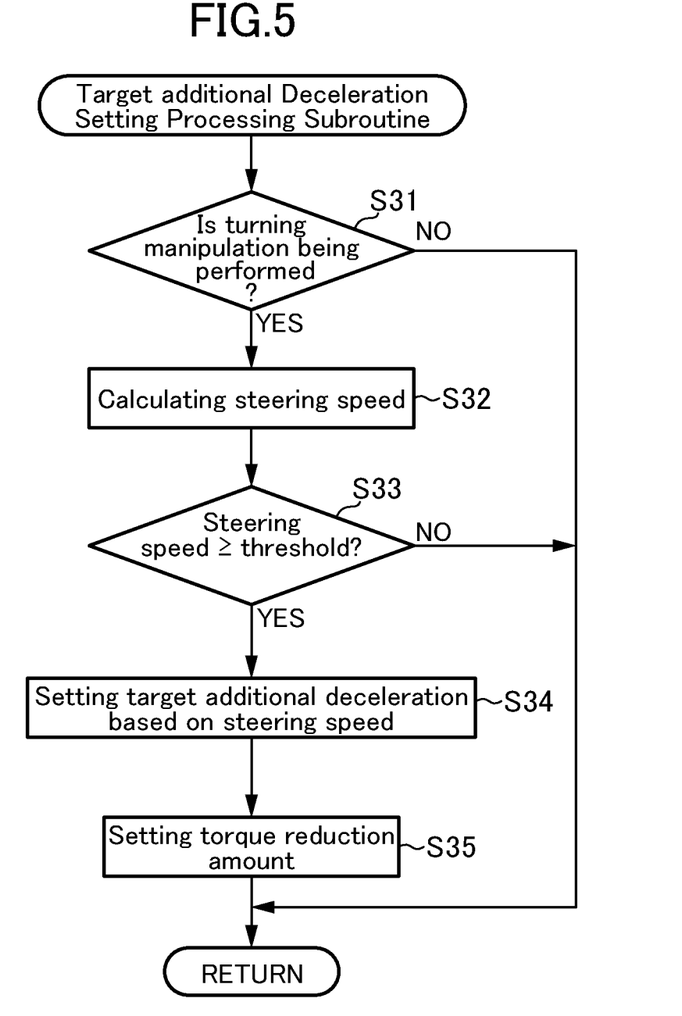
FIG. 5 is a flowchart of a target additional deceleration setting processing subroutine in the vehicle control system according to this embodiment.

FIG. 5 is a flowchart of the target additional deceleration setting processing subroutine in the vehicle control system according to this embodiment. FIG. 6 is a map showing a relationship between an additional deceleration and the steering speed.

Upon start of the additional deceleration setting processing subroutine, the PCM 16 operates, in step S31, to determine whether or not a turning manipulation of the steering wheel 6 is being performed (i.e., the steering angle (absolute value) is increasing).

As a result, when the turning manipulation is determined to be being performed, the subroutine proceeds to step S32 in which the PCM 16 operates to calculate a steering speed based on the steering angle acquired from the steering angle sensor 8 in the step S11 of the behavior control processing routine in FIG. 4.

Subsequently, the PCM 16 operates, in step S33, to determine whether or not the steering speed is equal to or greater than a given threshold $S_1$.

As a result, when the steering speed is determined to be equal to or greater than the threshold $S_1$, the subroutine proceeds to step S34 in which the PCM 16 operates to set an additional deceleration based on the steering speed. This additional deceleration means a deceleration to be added to the vehicle 1 in response to the steering manipulation, so as to control the vehicle behavior in conformity to the intention of the driver.

Figure 6:
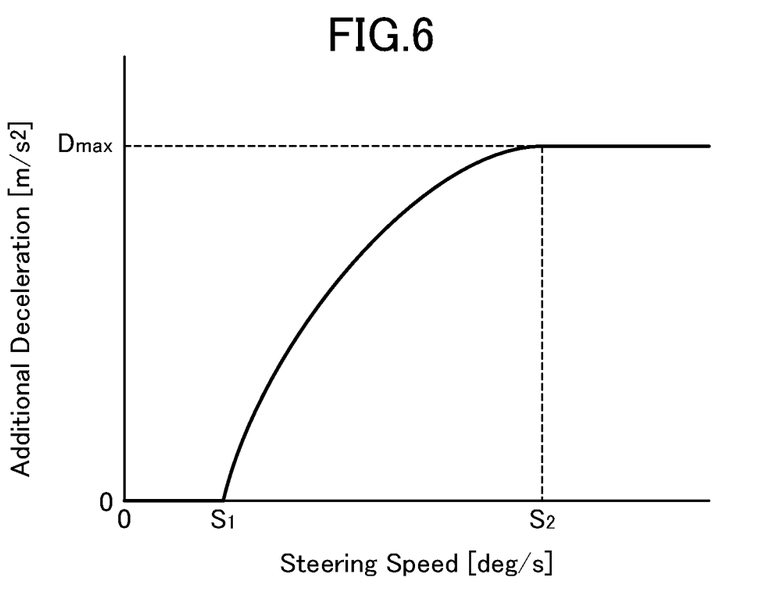
FIG. 6 is a map showing a relationship between an additional deceleration and a steering speed, in the vehicle control system according to this embodiment.

Specifically, the PCM 16 operates to set, as a target additional deceleration, a value of the additional deceleration corresponding to a value of the steering speed calculated in the step S32, based on the relationship between the additional deceleration and the steering speed indicated by the map in FIG. 6.

In FIG. 6, the horizontal axis represents the steering speed, and the vertical axis represents the additional deceleration. As depicted in FIG. 6, when the steering speed is less than the threshold $S_t$, a corresponding value of the additional deceleration is 0. That is, when the steering speed is less than the threshold $S_t$, the PCM 16 operates not to execute control of reducing the driving force of the vehicle 1 based on the steering manipulation (specifically, reducing the output torque of the engine 4) to add a deceleration to the vehicle 1.

On the other hand, when that the steering speed is equal to or greater than the threshold $S_1$, a value of the additional deceleration corresponding to this steering speed gradually comes closer to a given upper limit value $D_{max}$ as the steering speed becomes larger. That is, as the steering speed becomes larger, the additional deceleration gradually increases, and the rate of increase of the additional deceleration gradually decreases. This upper limit value $D_{max}$ is set at a level that the driver does not feel control intervention even when the deceleration is added to the vehicle 1 in response to the steering manipulation (e.g., 0.5 m/s² ≈ 0.05 G).

Further, when the steering speed is equal to or greater than a threshold $S_2$ greater than the threshold $S_t$, the additional deceleration is maintained at the upper limit value $D_{max}$.

Subsequently, the PCM 16 operates, in step S35, to set the torque reduction amount based on the target additional deceleration set in the step S34. Specifically, the PCM 16 operates to set the torque reduction amount necessary to realize the target additional deceleration by means of reduction of the output torque of the engine 4 to thereby, based on current values of the vehicle speed, the road grade, a current one of the gear stages, etc., acquired in the step S11.

After the step S35, the PCM 16 operates to terminate the target additional deceleration setting processing subroutine, and returned to the main routine.

On the other hand, when the turning manipulation of the steering wheel 6 is determined, in the step S31, not to be being performed, or when the steering speed is determined, in the step S33, to be less than the threshold $S_1$, the PCM 16 operates to terminate the target additional deceleration setting processing subroutine without setting any target additional deceleration, and returned to the main routine. In this case, the torque reduction amount is 0.

Returning to FIG. 4, after the steps S13 and S14, the PCM 16 operates, in step S15, to determine whether or not a driving force reduction restriction flag is 0. The driving force reduction restriction flag is a flag indicative of whether or not restriction on the control of reducing the output torque of the engine 4 (i.e., the driving force of the vehicle 1) by the torque reduction amount set through the target additional deceleration setting processing subroutine is performed, wherein it is set to 1 when the restriction on the control of reducing the output torque of the engine 4 is performed, and set to 0 when the restriction on the control of reducing the output torque of the engine 4 is not performed. The initial value of the driving force reduction restriction flag is 0.

As a result of the determination in the step S15, when the driving force reduction restriction flag is determined to be 0, i.e., when the restriction on the control of reducing the output torque of the engine 4 by the torque reduction amount set through the target additional deceleration setting processing subroutine is determined not to be performed, the routine proceeds to step S16 in which the PCM 16 operates to determine whether or not the swaying state flag set through the sway suppression control processing routine is 1.

As a result, when the swaying state flag is determined to be 1, i.e., when it is determined that the swaying phenomenon occurs in the trailer towed by the vehicle 1, and sway suppression control based on the brake units 18 is executed to suppress the swaying phenomenon, the routine proceeds to step S17 in which the PCM 16 operates to determine whether or not the control of reducing the output torque of the engine 4 (i.e., the driving force of the vehicle 1) by the torque reduction amount set through the target additional deceleration setting processing subroutine is executed in the last cycle of the attitude control processing routine, and whether or not the torque reduction amount (driving force reduction amount) is equal to or greater than a given value $D_1$. This value $D_1$ is set at a level that the driver does not have a feel of strangeness even when the output torque of the engine 4 is immediately returned. For example, it is a torque reduction amount which causes a deceleration of 0.02 G or less in the vehicle 1 (it should be noted that a specific value thereof varies depending on the weight of or traveling conditions of the vehicle 1).

As a result, when the control of reducing the output torque of the engine 4 is determined not to be executed, or when the torque reduction amount is less than $D_1$, the routine proceeds to step S18 in which the PCM 16 operates to set, as a final target torque, the basic target torque set in the step S13. In this way, the control of reducing the output torque of the engine 4 by the torque reduction amount set through the target additional deceleration setting processing subroutine is restricted. Then, the PCM 16 operates, in step S19, to set the driving force reduction restriction flag to 1.

Returning to the step S15, when the driving force reduction restriction flag is determined to be 1, i.e., when the restriction on the control of reducing the output torque of the engine 4 by the torque reduction amount set through the target additional deceleration setting processing subroutine is determined to be performed, the routine proceeds to step S20 in which the PCM 16 operates to determine whether or not the vehicle speed is equal to or less than a given value $V_1$. This value $V_1$ is set to a low value enough to be free from occurrence of the swaying phenomenon. For example, it is 40 km/h.

As a result, when the vehicle speed is determined to be greater than $V_1$, i.e., when it is determined that the swaying phenomenon is likely to occur, the routine proceeds to the step S18 in which the PCM 16 operates to set, as the final target torque, the basic target torque set in the step S13. That is, the restriction on the control of reducing the output torque of the engine 4 is continued.

On the other hand, when the vehicle speed is determined to be equal to or less than $V_1$, i.e., when it is determined that the swaying phenomenon is less likely to occur, the routine proceeds to step S21 in which the PCM 16 operates to set the driving force reduction restriction flag to 0. Subsequently, the PCM 16 operates, in step S22, to set the final target torque, based on the basic target torque set in the step S12 and the torque reduction amount set in the step S14. For example, the PCM 16 operates to set, as the final target torque, a value obtained by subtracting the torque reduction amount from the basic target torque. That is, the restriction on the control of reducing the output torque of the engine 4 is terminated.

Returning to the step S16, when the swaying state flag is 0, i.e., when it is determined that no swaying phenomenon occurs in the trailer towed by the vehicle 1, and the sway suppression control based on the brake units 18 is not executed, there is no need to restrict the control of reducing the output torque of the engine 4. Thus, the routine proceeds to the step S22 in which the PCM 16 operates to set, as the final target torque, the value obtained by subtracting the torque reduction amount from the basic target torque.

Further, returning to the step S17, assume that the control of reducing the output torque of the engine 4 by the torque reduction amount set through the target additional deceleration setting processing subroutine is determined to be executed in the last cycle of the attitude control processing routine, and the torque reduction amount is determined to be equal to or greater than $D_1$. In this situation, if the control of reducing the output torque of the engine 4 is stopped to immediately return the output torque of the engine 4, the driver is likely to have a feeling of strangeness. Thus, the routine proceeds to step S22 in which the PCM 16 operates to set, as the final target torque, the value obtained by subtracting the torque reduction amount from the basic target torque. That is, the control of reducing the output torque of the engine 4 is continued.

After the step S19 or S22, the PCM 16 operates, in step S23, to control the engine 4 to cause the engine 4 to output the final target torque set in the step S19 or S22. Specifically, the PCM 16 operates to, based on the final target torque set in the step S18 or S22 and an engine speed, set various state amounts (e.g., air charge amount, fuel injection amount, intake-air temperature, and oxygen concentration) necessary to realize the final target torque, and then, based on the set state amounts, control a plurality of actuators each for driving a respective one of a plurality of components of the engine 4. In this case, the PCM 16 operates to, before executing the control, set a limit value or range with respect to each of the state amounts, and set a control amount for each actuator to allow its related state amount to preserve limitation by the limit value or range.

More specifically, when setting the final target torque by subtracting the torque reduction amount from the basic target torque, the PCM 16 operates to retard an ignition timing of the spark plug 28 with respect to a point to be set when the basic target torque is directly set as the final target torque, thereby reducing the output torque of the engine 4.

On the other hand, assuming that the engine 4 is a diesel engine, when setting the final target torque by subtracting the torque reduction amount from the basic target torque, the PCM 16 operates to reduce a fuel injection amount with respect to a value to be set when the basic target torque is directly set as the final target torque, thereby reducing the output torque of the engine 4.

After the step S23, the PCM 16 operates to complete one cycle of the attitude control processing routine.

As mentioned above, in this embodiment, when the reversal of yaw rate of the vehicle 1 is repeated i.e., a swaying phenomenon occurs, in the situation where the vehicle 1 performs a towing operation, the PCM 16 operates to restrict the control of generating a deceleration in the vehicle 1 by means of the reduction of the output torque of the engine 4 based on the increase in the steering angle. Thus, under occurrence of the swaying phenomenon, it is possible to restrict execution of the driving force reduction control based on influences of a steering manipulation by the driver seeking to suppress the swaying phenomenon, and a disturbance applied to steerable road wheels 2 of the vehicle 1 due to the swaying phenomenon of the trailer, thereby preventing the swaying phenomenon from being undesirably promoted by the driving force reduction control. That is, it is possible to restrict execution of unnecessary or excessive attitude control from the view point of suppressing the swaying phenomenon, thereby preventing the swaying phenomenon from becoming worse due to the reduction of the output torque of the engine 4 based on the increase in the steering angle.

In this embodiment, the PCM 16 can accurately determine, based on the cycle period and/or amplitude of the reversal of the yaw rate of the vehicle 1, whether or not the swaying phenomenon occurs. This makes it possible to, when no swaying phenomenon occurs, perform the vehicle attitude control conforming to the intention of the driver, and, when the swaying phenomenon occurs, prevent the swaying phenomenon from becoming worse due to the reduction of the output torque of the engine 4 based on the increase in the steering angle.

In this embodiment, when the swaying phenomenon occurs, the PCM 16 operates to control the brake units 18 of the vehicle 1 to suppress the swaying phenomenon, so that it is possible to suppress the swaying phenomenon by the control of the brake units 18, while preventing a situation where the swaying phenomenon becomes worse, or suppression of the swaying phenomenon is hindered, due to the reduction of the output torque of the engine 4 based on the increase in the steering angle.

In this embodiment, in the situation where the control of reducing the output torque of the engine 4 based on the increase in the steering angle is already being executed, the PCM 16 operates to continue the reduction of the output torque of the engine 4 based on the increase in the steering angle, even if the swaying phenomenon occurs. This makes it possible to prevent the driver from having a feeling of strangeness due to the operation of stopping the output torque of the engine 4 to immediately return the output torque.

Particularly, in the situation where the amount of the output torque of the engine 4 to be reduced based on the increase in the steering angle is equal to or greater than $D_1$, the PCM 16 operates to continue the control of reducing the output torque of the engine 4 based on the increase in the steering angle, even if the swaying phenomenon occurs. This makes it possible to, in a situation where, if the control of reducing the output torque of the engine 4 is stopped to immediately return the output torque, the driver is highly likely to have a feeling of strangeness, continue the reduction of the output torque of the engine 4, even if the swaying phenomenon occurs, thereby preventing the driver from having a feeling of strangeness.

In this embodiment, in the situation where, under occurrence of the swaying phenomenon, the PCM 16 operates to restrict the reduction of the output torque of the engine 4 based on the increase in the steering angle, the restriction on the reduction of the output torque of the engine 4 is continued until the vehicle speed becomes equal to or less than $V_1$, so that it is possible to restrict execution of unnecessary or excessive attitude control from the view point of suppressing the swaying phenomenon. This makes it possible to reliably prevent the swaying phenomenon from becoming worse due to the reduction of the output torque of the engine 4 based on the increase in the steering angle.

<Modifications>

Last of all, some modifications of the above embodiments will be described.

The above embodiment has been described based on an example in which the vehicle attitude control is executed using the steering angle of the vehicle 1 as the steering angle-related value. Alternatively, the vehicle control system may be configured to execute the vehicle attitude control based on a yaw rate or a lateral acceleration, instead of the steering angle. The steering angle, the yaw rate and the lateral acceleration are included in examples of "steering angle-related value" set forth in the appended claims.

The above embodiment has been described based on an example in which the PCM 16 operates to generate a deceleration in the vehicle 1 by means of the reduction of the output torque of the engine 4. Alternatively, in addition to or in place of the reduction of the output torque of the engine 4, the deceleration may be generated by reducing the driving force of the vehicle 1, specifically, by means of: a braking force based on regenerative brake caused by rotating an alternator to generate electric power; a braking force based on engine brake caused by changing a gear ratio of an automatic transmission 30 to a lower speed side (downshifting, etc.) when the accelerator pedal is not depressed; a reduction in vehicle driving force caused by lowering the degree of engagement of (more slipping) a clutch element and/or a brake element inside the automatic transmission 30; or a rotational resistance of an engine auxiliary component configured to be driven by the engine 4 such as an air-conditioner compressor 36. In this case, at least one of the alternator, the automatic transmission 30 and the compressor 36 functions as "driving force control mechanism" set forth in the appended claims.

The above embodiment has been described based on an example in which, when the reversal of the yaw rate of the vehicle 1 is repeated, wherein the amplitude of the reversal is equal to or greater than $Y_1$, and the period of the reversal is equal to or less than $T_1$, the PCM 16 operates to determine that the trailer is in the swaying state. Alternatively, the swaying state may be determined based on a different condition. For example, the swaying state may be determined based on only one of the condition for the amplitude of the reversal and the condition for the period of the reversal. Alternatively, the swaying state may be determined based on a change in lateral acceleration of the vehicle 1 detected by the acceleration sensor 14.

LIST OF REFERENCE SIGNS

1: vehicle
2: front road wheel
4: engine
6: steering wheel
8: steering angle sensor
10: vehicle speed sensor
12: yaw rate sensor
14: acceleration sensor
16: PCM
18: brake unit
20: brake control system
22: hydraulic pump
24: valve unit
26: hydraulic pressure sensor
28: spark plug 30: automatic transmission
32: clutch element
34: brake element
36: air-conditioner compressor

The invention claimed is:

1. A vehicle control system comprising:
a steering device;
a driving force control mechanism configured to control a driving force of a vehicle; and
a processor configured to control the driving force control mechanism, wherein the processor is configured:
to control the driving force control mechanism to reduce the driving force of the vehicle, when a steering angle-related value related to a steering angle of the steering device increases; and
to restrict a reduction of the driving force based on an increase in the steering angle-related value, when a reversal of a yaw rate of the vehicle is repeated in a situation where the vehicle performs a towing operation;
wherein when a cycle period of the reversal of the yaw rate of the vehicle is equal to or less than a given value, the processor is configured to restrict the reduction of the driving force based on the increase in the steering angle-related value.

2. The vehicle control system according to claim 1, wherein, when an amplitude of the reversal of the yaw rate of the vehicle is equal to or greater than a given value, the processor is configured to restrict the reduction of the driving force based on the increase in the steering angle-related value.

3. The vehicle control system according to claim 2, wherein, when the reversal of the yaw rate of the vehicle is repeated in the situation where the vehicle performs the towing operation, the processor is configured to control a brake device of the vehicle, thereby suppressing the reversal of the yaw rate of the vehicle.

4. The vehicle control system according to claim 3, wherein, when the reduction of the driving force based on the increase in the steering angle-related value is restricted, the processor is configured to continue a restriction on the reduction of the driving force based on the increase in the steering angle-related value until a vehicle speed becomes a given value or less.

5. The vehicle control system according to claim 2, wherein, when the reduction of the driving force based on the increase in the steering angle-related value is restricted, the processor is configured to continue a restriction on the reduction of the driving force based on the increase in the steering angle-related value until a vehicle speed becomes a given value or less.

6. The vehicle control system according to claim 1, wherein, when the reversal of the yaw rate of the vehicle is repeated in the situation where the vehicle performs the towing operation, the processor is configured to control a brake device of the vehicle, thereby suppressing the reversal of the yaw rate of the vehicle.

7. The vehicle control system according to claim 6, wherein, when the reduction of the driving force based on the increase in the steering angle-related value is restricted, the processor is configured to continue a restriction on the reduction of the driving force based on the increase in the steering angle-related value until a vehicle speed becomes a given value or less.

8. The vehicle control system according to claim 1, wherein, when a repetition of the reversal of the yaw rate of the vehicle occurs in a situation where the driving force control mechanism is being controlled to reduce the driving force of the vehicle based on the increase in the steering angle-related value, the processor is configured to continue the reduction of the driving force based on the increase in the steering angle-related value.

9. The vehicle control system according to claim 8, wherein, when the repetition of the reversal of the yaw rate of the vehicle occurs in a situation where an amount of the driving force of the vehicle to be reduced based on the increase in the steering angle-related value is equal to or greater than a given value, the processor is configured to continue the reduction of the driving force based on the increase in the steering angle-related value.

10. The vehicle control system according to claim 9, wherein, when the reduction of the driving force based on the increase in the steering angle-related value is restricted, the processor is configured to continue a restriction on the reduction of the driving force based on the increase in the steering angle-related value until a vehicle speed becomes a given value or less.

11. The vehicle control system according to claim 8, wherein, when the reduction of the driving force based on the increase in the steering angle-related value is restricted, the processor is configured to continue a restriction on the reduction of the driving force based on the increase in the steering angle-related value until a vehicle speed becomes a given value or less.

12. The vehicle control system according to claim 1, wherein, when the reduction of the driving force based on the increase in the steering angle-related value is restricted, the processor is configured to continue a restriction on the reduction of the driving force based on the increase in the steering angle-related value until a vehicle speed becomes a given value or less.

13. The vehicle control system according to claim 1, wherein, when the reversal of the yaw rate of the vehicle is repeated in the situation where the vehicle performs the towing operation, the processor is configured to control a brake device of the vehicle, thereby suppressing the reversal of the yaw rate of the vehicle.

14. The vehicle control system according to claim 13, wherein, when the reduction of the driving force based on the increase in the steering angle-related value is restricted, the processor is configured to continue a restriction on the reduction of the driving force based on the increase in the steering angle-related value until a vehicle speed becomes a given value or less.

15. The vehicle control system according to claim 1, wherein, when the reduction of the driving force based on the increase in the steering angle-related value is restricted, the processor is configured to continue a restriction on the reduction of the driving force based on the increase in the steering angle-related value until a vehicle speed becomes a given value or less.

* * * * *